United States Patent
Park et al.

(10) Patent No.: US 12,328,302 B2
(45) Date of Patent: Jun. 10, 2025

(54) APPARATUS AND METHOD FOR STORING AND ENCRYPTING DATA BASED ON ADAPTIVE AUTOSAR

(71) Applicant: HYUNDAI AUTOEVER CORP., Seoul (KR)

(72) Inventors: Ji-Woong Park, Gwangju-si (KR); Keon-Woo Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 226 days.

(21) Appl. No.: 18/075,912

(22) Filed: Dec. 6, 2022

(65) Prior Publication Data

US 2023/0179580 A1    Jun. 8, 2023

(30) Foreign Application Priority Data

Dec. 8, 2021    (KR) .................. 10-2021-0174312

(51) Int. Cl.
*H04L 9/40* (2022.01)
*G06F 21/60* (2013.01)
*G06F 21/78* (2013.01)
*H04L 9/08* (2006.01)
*H04L 9/12* (2006.01)

(52) U.S. Cl.
CPC ................ *H04L 63/0428* (2013.01)

(58) Field of Classification Search
CPC ..... H04L 63/0428; H04L 9/12; H04L 9/0894; H04L 2209/84; G06F 21/602; G06F 21/78
See application file for complete search history.

(56) References Cited

U.S. PATENT DOCUMENTS

| | | | | |
|---|---|---|---|---|
| 2007/0180515 A1* | 8/2007 | Danilak | ............... | G06F 21/79 726/16 |
| 2010/0162203 A1* | 6/2010 | Kim | ............... | G06F 9/45512 717/105 |
| 2016/0112188 A1* | 4/2016 | Choi | ............... | G09C 1/00 380/28 |
| 2016/0352511 A1* | 12/2016 | Bashyam | ............... | H04L 9/3242 |
| 2021/0192867 A1* | 6/2021 | Fang | ............... | G07C 5/008 |

FOREIGN PATENT DOCUMENTS

KR    101975800 B1    5/2019

OTHER PUBLICATIONS

Modeling and Generation of Secure Component Communications in AUTOSAR, by Natale et al., published 2017 (Year: 2017).*

* cited by examiner

*Primary Examiner* — Vu V Tran
(74) *Attorney, Agent, or Firm* — Lempia Summerfield Katz LLC (57) ABSTRACT

Disclosed are an apparatus and method for storing and encrypting data based on Adaptive automotive open system architecture (AUTOSAR). An apparatus for storing and encrypting data based on Adaptive AUTOSAR includes a storage module (Persistency) included in an application program interface (API) defined in the Adaptive AUTOSAR and configured to manage storage and loading of a file for using an application, The apparatus also includes an encryption processor (Cryptography) included in the API and configured to provide a function for an encryption and decryption of the file. The storage module may encrypt and decrypt the file by using a streaming duplexing method when encrypting and decrypting the file using the encryption processor.

9 Claims, 6 Drawing Sheets

APPARATUS AND METHOD FOR STORING AND ENCRYPTING DATA BASED ON ADAPTIVE AUTOSAR

CROSS-REFERENCE TO RELATED APPLICATION

This application claims the benefit of and priority to Korean Patent Application No. 10-2021-0174312, filed on Dec. 8, 2021, the entire contents of which are incorporated herein by reference.

FIELD

Embodiments of the present disclosure relate to an apparatus and method for storing and encrypting data based on Adaptive AUTOSAR, and more particularly, to an apparatus and method for storing and encrypting data based on Adaptive AUTOSAR, which enable data to be encrypted/decrypted for security when the reading/writing of the data is used in a storage module (Persistency) that is one of Adaptive AUTOSAR modules.

BACKGROUND

Automotive open system architecture (AUTOSAR) is mounted on many vehicles, as a software standard platform for a vehicle. AUTOSAR, started from a platform for control, has been extended from AUTOSAR CLASSIC, the existing platform for control-to an adaptive platform that connects autonomous driving and infotainment.

AUTOSAR is a series of platforms that set a basic software module, define an application interface, and construct a development methodology based on a standardized data exchange format. AUTOSAR is defined as three layers including i) basic software (hereinafter referred to as "BSW") that plays a role as a computer operating system in which functions that are commonly used in an electronic control unit (hereinafter referred to as an "ECU") within a vehicle are implemented, ii) application software (hereinafter referred to as "ASW") in which detailed functions on which the ECU actually operates are implemented, and iii) a runtime environment (hereinafter referred to as an "RTE") that is responsible for the data communication of the BSW and the ASW.

As the BSW and the RTE implement communication with the ECU control as described above, software can be designed in the AUTOSAR platform regardless of the ECU and a vehicle. Thus, the AUTOSAR system has become more important as a driving system such as a fuel efficiency aid, a safety system such as a lane departure/drowsing prevention device and a monitoring system, and various electrical products such as a navigation system and a rear-camera are applied to the AUTOSAR system in addition to the ECU of a vehicle. The AUTOSTAR platform described above is referred to as "AUTOSAR CLASSIC".

Following AUTOSAR CLASSIC, "Adaptive AUTOSAR" was newly designed in order to handle new requirements. Adaptive AUTOSAR extends AUTOSAR and AUTOSAR CLASSIC, and enables vehicle field IT convergence technologies, such as an "advanced driver assistance system (ADAS)", vehicle to everything (V2X), and autonomous driving infrastructure.

Figure 1:
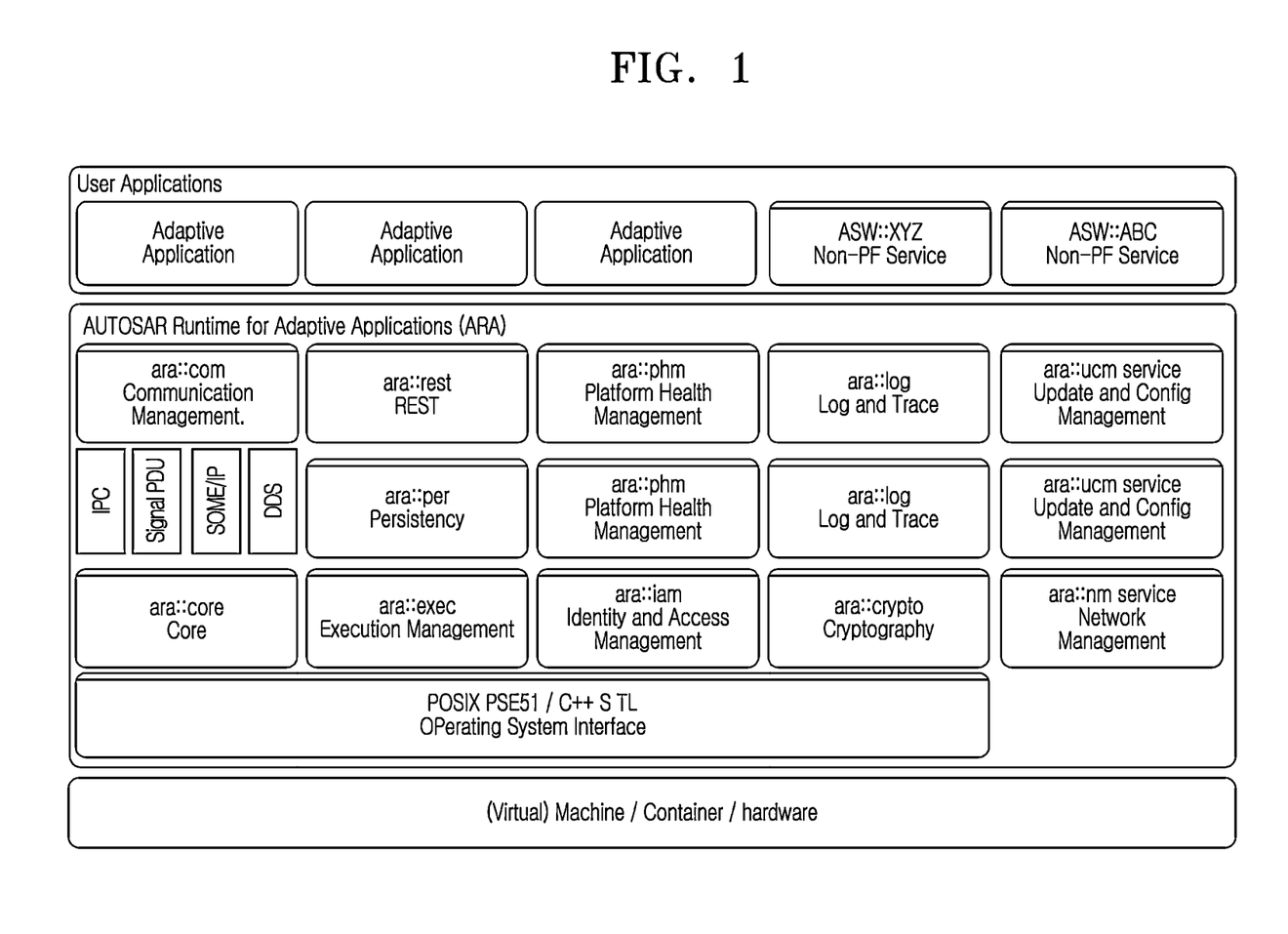
FIG. 1 is a diagram for describing Adaptive AUTOSAR.

As illustrated in FIG. 1, Adaptive AUTOSAR is divided into three parts. Adaptive AUTOSTAR uses hardware having an excellent operation processing ability and running a POSIX operating system that is based on UNIX instead of the BSW and supports a multi-core processor. Unlike AUTOSAR CLASSIC that enables only the update of the entire ECU in addition to a standardized interface that efficiently integrates several applications into a system, Adaptive AUTOSAR includes update and configuration management (UCM) capable of controlling an individual application. A vehicle that uses the Adaptive AUTOSAR platform can be easily controlled by a central system although various electrical products are added. The Adaptive AUTOSAR platform can be used without difficulty even when an autonomous driving system is subsequently applied to the Adaptive AUTOSAR platform.

However, a storage module (Persistency), which one of Adaptive AUTOSAR modules, currently does not include an implementation method for data encryption/decryption.

The foregoing is intended merely to aid in the understanding of the background of the present disclosure, and is not intended to mean that the present disclosure falls within the purview of the related art that is already known to those having ordinary skill in the art.

SUMMARY

Various embodiments are directed to providing an apparatus and method for storing and encrypting data based on Adaptive AUTOSAR, to enable data to be encrypted/decrypted for security when the reading/writing of the data is used in a storage module (Persistency), which is one of Adaptive AUTOSAR modules.

Objects to be solved by the present disclosure are not limited to the aforementioned object(s), and the other object(s) not described above may be evidently understood from the following description by those skilled in the art.

In an embodiment, an apparatus for storing and encrypting data based on Adaptive automotive open system architecture (AUTOSAR) includes a storage module included in an application program interface (API) defined in the Adaptive AUTOSAR and configured to manage storage and loading of a file for using an application, and an encryption processor (Cryptography) included in the API and configured to provide a function for the encryption and decryption of the file. The storage module may encrypt and decrypt the file by using a streaming duplexing method when encrypting and decrypting the file using the encryption processor.

In an aspect, the storage module may be configured to: load the file as a streaming by using open storage (OpenStorage), determine whether the loaded original streaming is an encrypted file, and, when the loaded original streaming is an encrypted file, generate a decrypted streaming by decrypting the original streaming using the encryption processor.

In an aspect, the storage module may be configured to determine whether the original streaming is an encrypted file by identifying a signature of the file.

In an aspect, the storage module may be configured to decrypt the original streaming by parsing the original streaming using a Hex dump method.

In an aspect, the storage module may be configured to: load the decrypted streaming using Close Storage, generate the original streaming by encrypting the decrypted streaming, store the original streaming, and discard the decrypted streaming.

In an aspect, the storage module may be configured to encrypt the decrypted streaming by parsing the decrypted streaming using a Hex dump method.

In another embodiment, a method for storing and encrypting data based on Adaptive automotive open system architecture (AUTOSAR) includes: loading, by a storage module, a file as a streaming by using open storage (OpenStorage), determining, by the storage module, whether the loaded original streaming is an encrypted file, generating, by the storage module, a decrypted streaming by decrypting the original streaming using an encryption processor when the loaded original streaming is an encrypted file, and reading or writing, by the storage module, an application by using the decrypted streaming.

In an aspect, the method may further include, after reading or writing of the application, loading, by the storage module, the decrypted streaming by using Close Storage, generating, by the storage module, the original streaming by encrypting the decrypted streaming, storing, by the storage module, the original streaming, and discarding, by the storage module, the decrypted streaming.

In an aspect, generating the original streaming may comprise encrypting the decrypted streaming by parsing the decrypted streaming using a Hex dump method.

In an aspect, determining whether the loaded original streaming is an encrypted file may comprise determining whether the original streaming is an encrypted file by identifying a signature of the file.

In an aspect, generating the decrypted streaming may comprise decrypting the original streaming by parsing the original streaming using a Hex dump method.

The apparatus and method for storing and encrypting data based on Adaptive AUTOSAR according to embodiments of the present disclosure can encrypt/decrypt data for security when the reading/writing of the data is used in the storage module (Persistency), which is one of the Adaptive AUTOSAR modules.

The apparatus and method for storing and encrypting data based on Adaptive AUTOSAR according to embodiments of the present disclosure have an effect in that security is improved because the streaming duplexing method is used rather than a method using the copy of a file that is vulnerable to security upon decryption.

Effects of the present disclosure are not limited to the aforementioned effects, and may include various effects within a range that is evident to those skilled in the art from the following description.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Hereinafter, embodiments of the present disclosure are described in detail with reference to the accompanying drawings. The thicknesses of lines or the sizes of elements illustrated in the drawings may have been exaggerated for the clarity of a description and for convenience' sake. Terms described below have been defined by taking into consideration their functions in the present disclosure, and may be changed depending on a user or operator's intention or practice. Accordingly, such terms should be defined based on the overall contents of this specification.

When a component, device, element, or the like of the present disclosure is described as having a purpose or performing an operation, function, or the like, the component, device, or element should be considered herein as being "configured to" meet that purpose or to perform that operation or function.

An implementation described in this specification may be realized as a method or process, an apparatus, a software program, a data stream or a signal, for example. Although the present disclosure has been discussed only in the context of a single form of an implementation (e.g., discussed as only a method), an implementation of a discussed characteristic may also be realized in another form (e.g., apparatus or program). The apparatus may be implemented as proper hardware, software or firmware. The method may be implemented in an apparatus, such as a processor, commonly referred to as a processing device, such as a computer, a microprocessor, an integrated circuit or a programmable logic device, for example. The processor may include a communication device, such as a computer, a cell phone, a mobile phone/personal digital assistant ("PDA") and another device which facilitates the communication of information between end-users.

Figure 2:
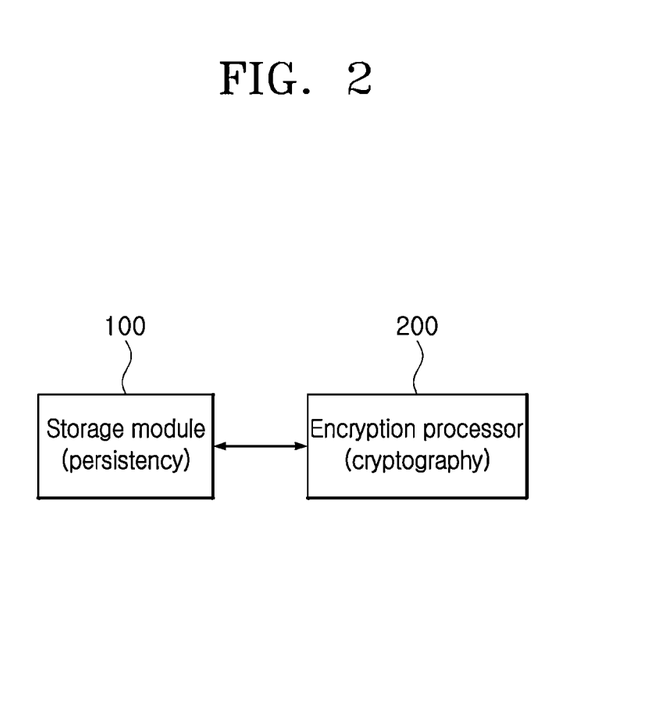
FIG. 2 is a diagram of an apparatus for storing and encrypting data based on Adaptive AUTOSAR according to an embodiment of the present disclosure.
Figure 3:
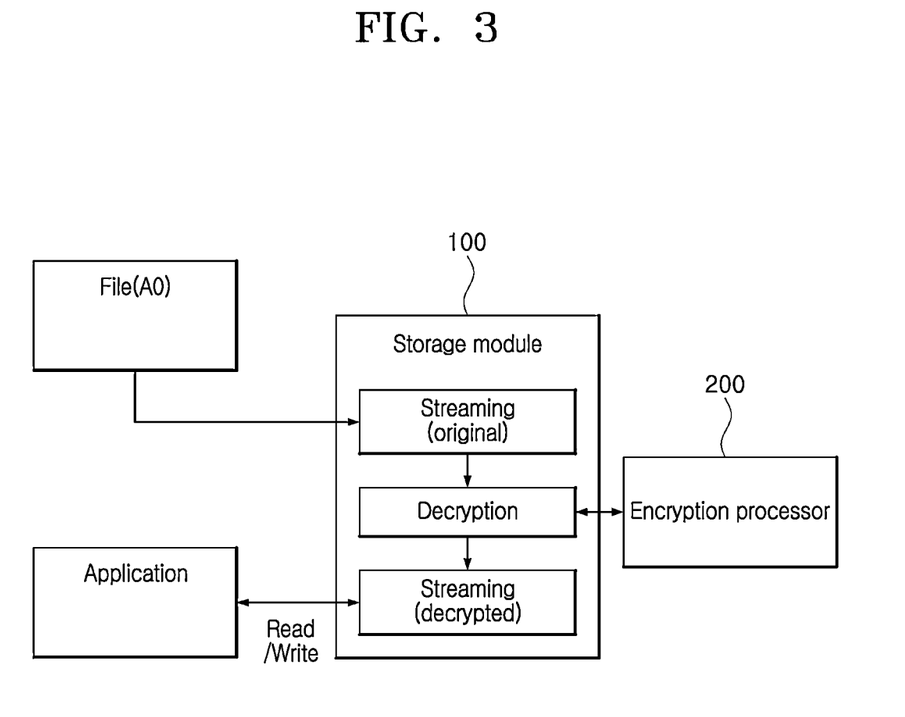
FIG. 3 is a diagram for describing a method of decrypting a file according to an embodiment of the present disclosure.
Figure 4:
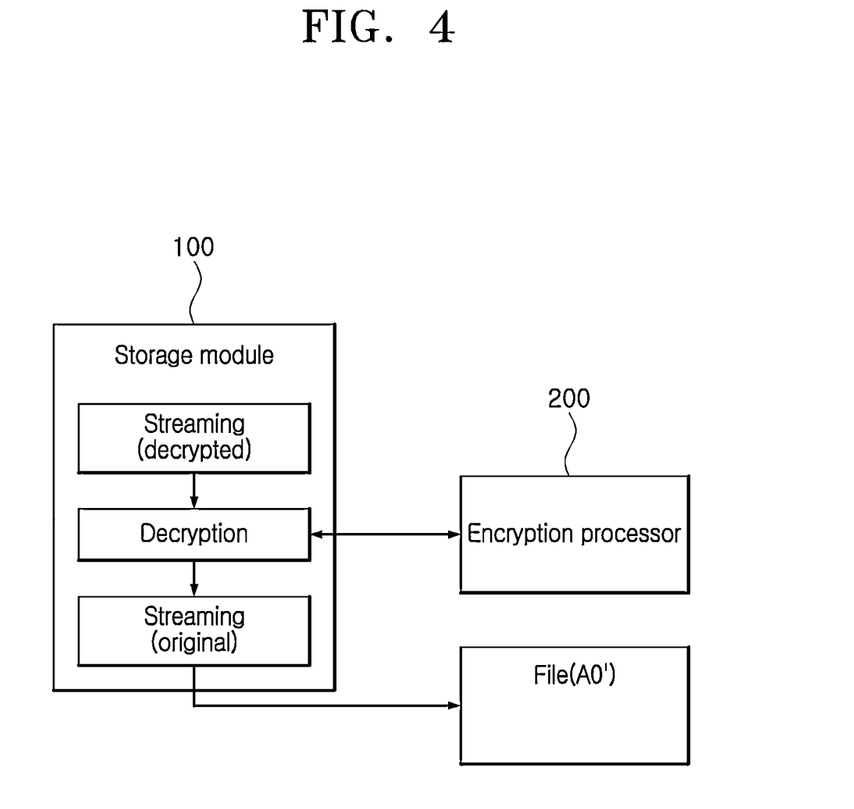
FIG. 4 is a diagram for describing a method of encrypting a file according to an embodiment of the present disclosure.

FIG. 2 is a diagram of an apparatus for storing and encrypting data based on Adaptive AUTOSAR according to an embodiment of the present disclosure. FIG. 3 is a diagram for describing a method of decrypting a file according to an embodiment of the present disclosure. FIG. 4 is a diagram for describing a method of encrypting a file according to an embodiment of the present disclosure.

Referring to FIG. 2, the apparatus for storing and encrypting data based on Adaptive AUTOSAR according to an embodiment of the present disclosure includes a storage module (Persistency) 100 and an encryption processor (Cryptography) 200.

The storage module 100 may be included in an application program interface (API) defined in Adaptive automotive open system architecture (AUTOSAR), and may manage the storage of an application. For example, the storage module 100 may be a functional cluster (FC) that is provided in the AUTOSAR standard, and may be configured to provide and manage a storage space of an application.

Furthermore, the storage module 100 may manage the storage and loading of a file for using an application. In this case, the storage module 100 may be configured to encrypt and decrypt a file. In an aspect, the storage module 100 may encrypt and decrypt the file by using a streaming duplexing method when encrypting and decrypting the file by using the encryption processor 200. In this case, the streaming duplexing method may mean generating a decrypted streaming other than the original streaming upon decryption, and generating an encrypted streaming (i.e., the original streaming) other than the decrypted streaming upon encryption.

A method of decrypting a file by the storage module 100, according to an embodiment, is described with reference to FIG. 3. The storage module 100 may load a file A0 as a streaming, and may generate a decrypted streaming by decrypting the loaded original streaming using the encryption processor 200. The storage module 100 may read/write an application by using the decrypted streaming. That is, the storage module 100 enables an application to be read/written by generating a separate decrypted streaming while not directly controlling an original file upon reading/writing of the application.

In an embodiment, the storage module 100 may load a file as a streaming by using open storage (OpenStorage). Thereafter, the storage module 100 may determine whether the loaded original streaming is an encrypted file. For example, the storage module 100 may determine whether the original streaming is an encrypted file by identifying a signature of the file.

If the original streaming is an encrypted file, the storage module 100 may use the encryption processor 200 to generate (or open) a decrypted streaming by parsing the original streaming using a Hex dump method. For example, the storage module 100 may decrypt the original streaming by converting the original streaming into a Hex value.

Streaming data including the original streaming and the decrypted streaming can have improved security because the streaming data is present only in a RAM region and it is also difficult to see a value of the streaming data by debugging.

A method of encrypting a file by the storage module 100, according to an embodiment, is described with reference to FIG. 4. Referring to FIG. 4, the storage module 100 may load a decrypted streaming, and may generate an encrypted streaming (i.e., original streaming) by encrypting the loaded decrypted streaming using the encryption processor 200. Thereafter, the storage module 100 may store the encrypted streaming (File(A0')).

In an embodiment, the storage module 100 may load the decrypted streaming by using Close Storage. Thereafter, the storage module 100 may generate the encrypted streaming (i.e., the original streaming) by parsing and encrypting the loaded decrypted streaming using the Hex dump method. For example, the storage module 100 may encrypt the decrypted streaming by converting the decrypted streaming into a Hex value. Thereafter, the storage module 100 may store the generated encrypted streaming (i.e., the original streaming), and discard the decrypted streaming.

As described above, the storage module 100 may generate a decrypted streaming by decrypting an encrypted file, may read/write an application by using the decrypted streaming, may generate an encrypted streaming again by encrypting the decrypted streaming, may store the encrypted streaming, and may discard the decrypted streaming.

The encryption processor 200 may be included in an API, and may provide a function related to the encryption and decryption of an application.

Figure 5:
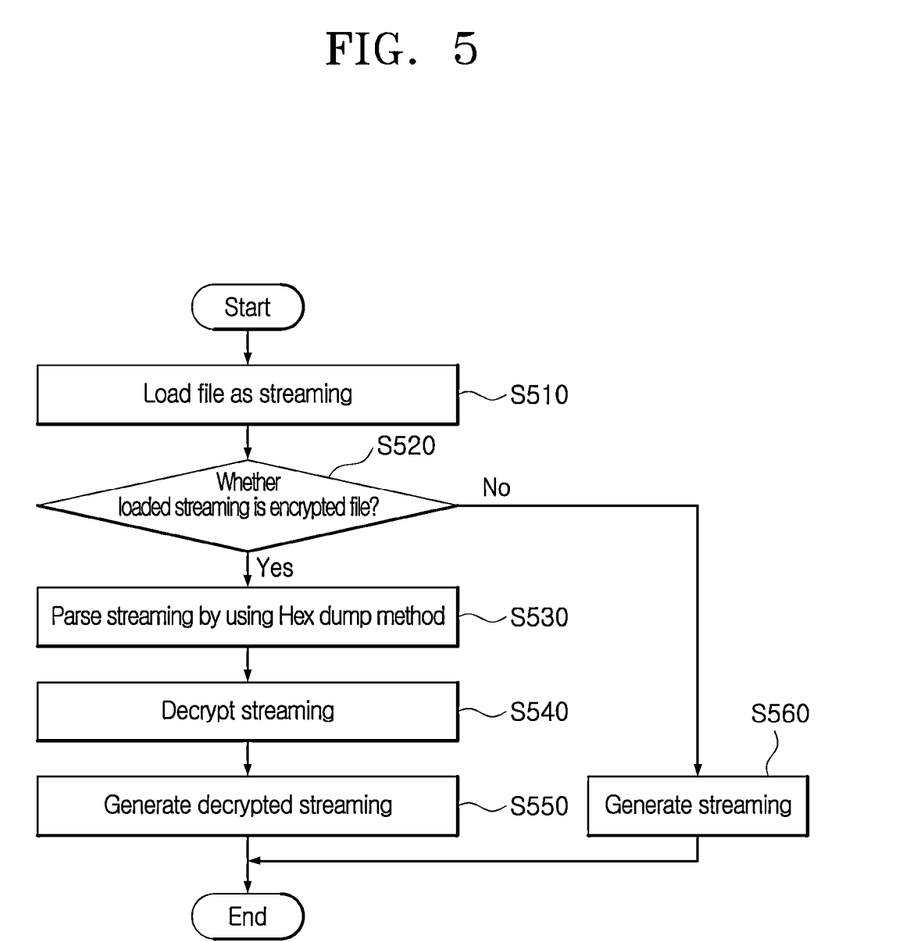
FIG. 5 is a flowchart of a method for decrypting data according to an embodiment of the present disclosure.

FIG. 5 is a flowchart of a method for decrypting data according to an embodiment of the present disclosure.

Referring to FIG. 5, the storage module 100 loads a file as a streaming using the open storage (OpenStorage) (S510).

The storage module 100 then determines whether the loaded streaming is an encrypted file (S520). For example, the storage module 100 may determine whether the loaded streaming is an encrypted file by identifying a signature of the file.

If it is determined at step S520 that the loaded streaming is an encrypted file, the storage module 100 may parse the loaded streaming using the Hex dump method (S530), and may generate (or open) a decrypted streaming (S550) by decrypting the original streaming (S540) using the encryption processor 200. For example, the storage module 100 may decrypt the loaded streaming by converting the loaded streaming into a Hex value. The storage module 100 may read/write an application by using the decrypted streaming.

On the other hand, if it is determined at step S520 that the loaded streaming is not an encrypted file, the storage module 100 may open (or generate) the loaded streaming (S560), and may read/write an application using the loaded streaming.

Figure 6:
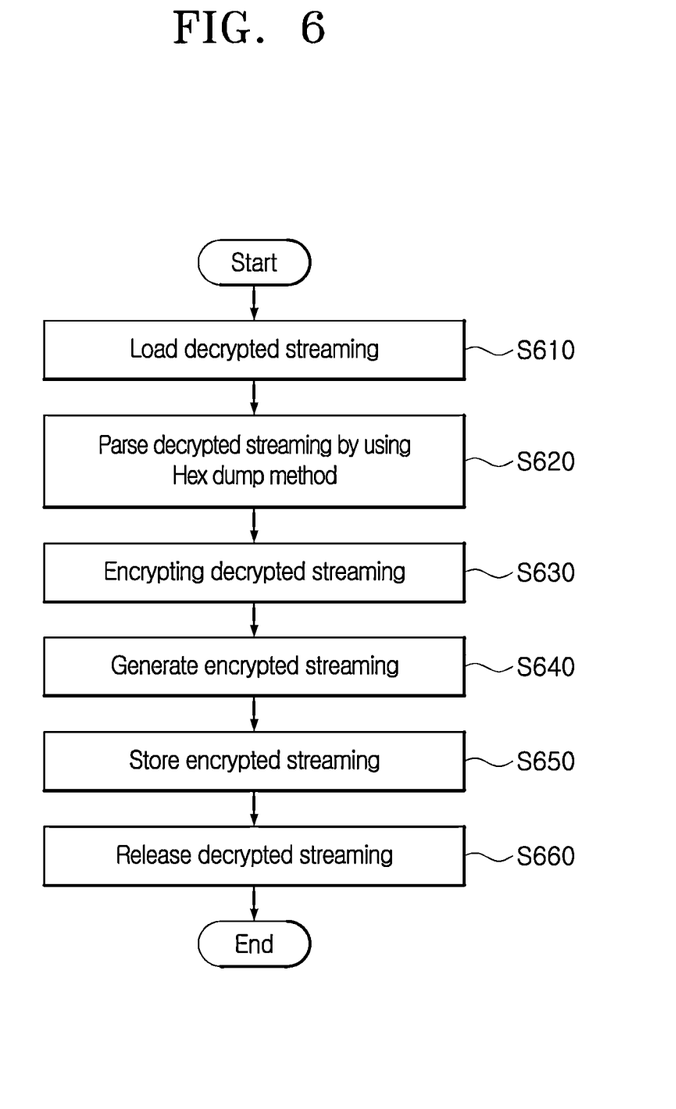
FIG. 6 is a flowchart of a method for encrypting data according to an embodiment of the present disclosure.

FIG. 6 is a flowchart of a method for encrypting data according to an embodiment of the present disclosure.

Referring to FIG. 6, the storage module 100 loads a decrypted streaming by using the Close Storage (S610).

The storage module 100 may then generate an encrypted streaming (S640) by parsing the loaded decrypted streaming using the Hex dump method (S620), and encrypting the loaded decrypted streaming (S630). For example, the storage module 100 may encrypt the decrypted streaming by converting the decrypted streaming into a Hex value.

The storage module 100 may store the generated encrypted streaming (S650), and may discard the decrypted streaming (S660). The encrypted streaming may be the original streaming. The storage module 100 may store the encrypted streaming and discard the decrypted streaming.

As described above, the apparatus and method for storing and encrypting data based on Adaptive AUTOSAR according to embodiments of the present disclosure can encrypt/decrypt data for security when the reading/writing of the data is used in the storage module (Persistency), which us one of Adaptive AUTOSAR modules.

The apparatus and method for storing and encrypting data based on Adaptive AUTOSAR according to embodiments of the present disclosure have an effect in that security is improved because the streaming duplexing method is used rather than a method using the copy of a file that is vulnerable to security upon decryption.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. An apparatus for storing and encrypting data based on Adaptive automotive open system architecture (AUTOSAR), the apparatus comprising:
    a storage module included in an application program interface (API) defined in the Adaptive AUTOSAR and configured to manage storage and loading of a file for using an application; and
    an encryption processor included in the API and configured to provide a function for an encryption and decryption of the file,
    wherein the storage module is configured to use the encryption processor to encrypt and decrypt the file by using a streaming duplexing method, the storage module being configured to
        load the file as a streaming by using open storage (OpenStorage), and
        determine whether the loaded original streaming is an encrypted file by identifying a signature of the file.

2. The apparatus of claim 1, wherein the storage module is further configured to,
    when the loaded original streaming is an encrypted file, generate a decrypted streaming by decrypting the original streaming using the encryption processor.

3. The apparatus of claim 2, wherein the storage module is configured to decrypt the original streaming by parsing the original streaming using a Hex dump method.

4. The apparatus of claim 2, wherein the storage module is configured to:
  load the decrypted streaming by using Close Storage,
  generate the original streaming by encrypting the decrypted streaming, store the original streaming, and discard the decrypted streaming.

5. The apparatus of claim 4, wherein the storage module is configured to encrypt the decrypted streaming by parsing the decrypted streaming using a Hex dump method.

6. A method for storing and encrypting data based on Adaptive automotive open system architecture (AUTOSAR), the method comprising:
  loading, by a storage module, a file as a streaming by using open storage (OpenStorage);
  determining, by the storage module, whether the loaded original streaming is an encrypted file by identifying a signature of the file;
  when the loaded original streaming is an encrypted file, generating, by the storage module, a decrypted streaming by decrypting the original streaming using an encryption processor; and
  reading or writing, by the storage module, an application by using the decrypted streaming.

7. The method of claim 6, further comprising:
  after reading or writing the application,
  loading, by the storage module, the decrypted streaming by using Close Storage,
  generating, by the storage module, the original streaming by encrypting the decrypted streaming,
  storing, by the storage module, the original streaming, and
  discarding, by the storage module, the decrypted streaming.

8. The method of claim 7, wherein generating the original streaming comprises encrypting the decrypted streaming by parsing the decrypted streaming using a Hex dump method.

9. The method of claim 6, wherein generating the decrypted streaming comprises decrypting the original streaming by parsing the original streaming using a Hex dump method.

* * * * *